Patented Apr. 26, 1949

2,468,061

UNITED STATES PATENT OFFICE 2,468,061

FUSE POWDER COMPOSITION

George C. Hale and David Hart, Dover, N. J.

No Drawing. Application May 11, 1944,
Serial No. 535,054

3 Claims. (Cl. 52—2)

(Granted under the act of March 3, 1883, as
amended April 30, 1928; 370 O. G. 757)

The invention described herein may be manufactured and used by or for the Government for governmental purposes without the payment to us of any royalty thereon.

The present invention relates to new and essentially non gaseous powder compositions intended for use in powder trains of ammunition to provide a definite burning time interval. Particularly the invention resides in the use of oxidizing agents with red phosphorus to produce the fuze powders hereinafter described and claimed.

The primary object of the invention is to provide a fuze powder composition which upon ignition, produces such temperatures as will cause all of the products to be non gaseous. A further object is to provide fuze powder composition which, when compressed to high density, will be readily and easily ignitable and will burn uniformly without failures to burn through, when once ignited.

We have discovered that there exists a definite relationship between the equivalent heat of an exothermic chemical reaction and the burning time of the composition taking part in this reaction, namely, the greater the equivalent heat of the reaction, the shorter the burning time of the composition and vice versa. It was found that the equivalent heat, not the total heat of reaction, governed the burning time of the composition. For example, the chemical reactions involved in the burning of the following two fuze powder compositions out of many which we have formulated and studied experimentally, i. e., (1) barium peroxide and red phosphorus and (2) barium chromate and red phosphorus. The reactions are as follows:

of reaction for (1) and (2) when stoichiometrical amounts are present in the compositions as 490 and 1030 kilocalories respectively. By the equivalent heat of reaction we mean the number of kilocalories liberated for one chemical equivalent of oxidizing agent or one chemical equivalent or red phosphorus. Hence, if we divide 490 by 10 (the number of chemical equivalents of red phosphorus in first reaction) and divide 1030 by 30 (the number of chemical equivalents of red phosphorus in the second reaction) we obtain 49 and 34 kilocalories, respectively, as the equivalent heats of the reactions. Thus, although the total heats of reaction are 490 and 1030 kilocalories respectively, the equivalent heats are in reverse order, namely, 49 and 34 kilocalories. Therefore, in accordance with the new chemical principle which we have discovered, composition (2) will burn more slowly than composition (1) because, despite the fact that its total heat of reaction is greater than (1) its equivalent heat of reaction is less than (1). Our laboratory tests confirmed this, since they showed that a 2 inch column of composition (1) burned in less than 1 second whereas the same column of composition (2) burned 6 seconds, when the two compositions were loaded and tested under identical conditions.

We have discovered experimentally that the employment of an oxidizing agent together with red phosphorus in the proper proportions, produces a fuze powder which is readily ignitable when compressed to high density and one in which the products of combustion are essentially non-gaseous. It has been found that when metallic chromates in general or when oxides of metals which have melting points above 400° C.

| | Total Heat of Reaction | Equivalent Heat of Reaction |
|---|---|---|
| (1) $5BaO_2 + 2P \longrightarrow 2BaO + Ba_3(PO_4)_2$<br>$5 \times 152 \quad 2 \times 4 \quad\quad 2 \times 133 \quad 992$ | 490 | 49 |
| (2) $10BaCrO_4 + 6P \longrightarrow BaO + 5Cr_2O_3 + 3Ba_3(PO_4)_2$<br>$10 \times 342 \quad 6 \times 4 \quad\quad 133 \quad 5 \times 273 \quad 3 \times 992$ | 1,030 | 34 |

The figures underneath each substance in the equations represent the heats of formation expressed in kilocalories per mole multiplied by the number of moles taking part in the reaction. A simple calculation, therefore, gives the total heats are burned with phosphorus there is no evidence of gas being evolved. Thus the compositions may be loaded in completely enclosed components and uniformity of burning obtained under such conditions. As examples, the following compositions have been particularly successful in producing easily ignitable, uniform burning, non-gaseous fuze powders of definite burning time intervals.

Table

| Composition No. | Oxidizing Agent | Per Cent | Red Phosphorus, Per Cent | Burning Time of Powder Column 2" long x 0.22" diam., secs. |
|---|---|---|---|---|
| 1 | Silver Oxide | 97 | 3 | less than 1 |
| 2 | Silver Chromate | 98 | 2 | 10 |
| 3 | ....do.... | 95 | 5 | 2 |
| 4 | Barium Peroxide | 93 | 7 | less than 1 |
| 5 | Cuprous Oxide | 95 | 5 | 4 |
| 6 | Barium Chromate | 96 | 4 | 13 |
| 7 | Strontium Chromate | 95 | 5 | 9 |
| 8 | Calcium Chromate | 90 | 10 | 17 |
| 9 | Iron Oxide, $Fe_2O_3$ | 90 | 10 | 15 |
| 10 | ....do.... | 85 | 15 | 9 |
| 11 | Iron Oxide, $Fe_3O_4$ | 90 | 10 | 33 |

Test data in addition to the table show that by varying the proportion of oxidizing agent to red phosphorus and by using reactions which have the necessary equivalent heat, burning rates can be obtained which vary from less than 1 second to 20 seconds per inch thus affording an opportunity to select particular compositions for various applications such as fuze powders, ignition powders, and delay powders which are now required in numerous items of military ammunition, bombs, and pyrotechnic devices. In addition to its action as a fuel in the fuze powders which we have formulated, red phosphorus, because of its low ignition temperature, renders these fuze powders much more ignitable than any other element previously employed, while at the same time, gives non-gaseous products. These new fuze powders are comparatively simple to prepare. The compositions may be wet with water or other liquid to prevent accidental ignition in manufacture, or they may be incorporated in the dry state. Following thorough incorporation, the fuze powders are granulated in commercially available mechanical granulations or by passing through screens. Although it has not been found necessary to use a binding agent to assist in granulating, it may be used if special cases should require a binder.

Since the products of combustion of these fuze powders are non-gaseous, the fuze powders are entirely non-explosive. They have also been found to possess excellent stability.

Having thus described the invention, what is claimed as new is:

1. A fuze powder composition including barium chromate 96 per cent and red phosphorus 4 per cent.

2. A delay powder train formed of a mixture comprising a metal chromate and red phosphorus, with the red phosphorus being present in amounts not exceeding fifteen percent of the mixture.

3. A delay powder train which burns without the production of a substantial quantity of gaseous product, said train being formed of a mixture comprising red phosphorus and a metal chromate, the said metal chromate and the said red phosphorus being so proportioned that when burned no substantial quantity of gaseous product will be evolved.

GEORGE C. HALE.
DAVID HART.

REFERENCES CITED

The following references are of record in the file of this patent:

UNITED STATES PATENTS

| Number | Name | Date |
|---|---|---|
| 1,960,591 | Nash | May 29, 1934 |
| 1,971,502 | Piccard | Aug. 28, 1934 |
| 2,185,371 | Burrows | Jan. 2, 1940 |
| 2,309,978 | Pratt | Feb. 2, 1943 |